Nov. 21, 1950     K. M. WATSON     2,530,558
GAS-SOLID CONTACT APPARATUS
Filed Nov. 15, 1945     4 Sheets-Sheet 1
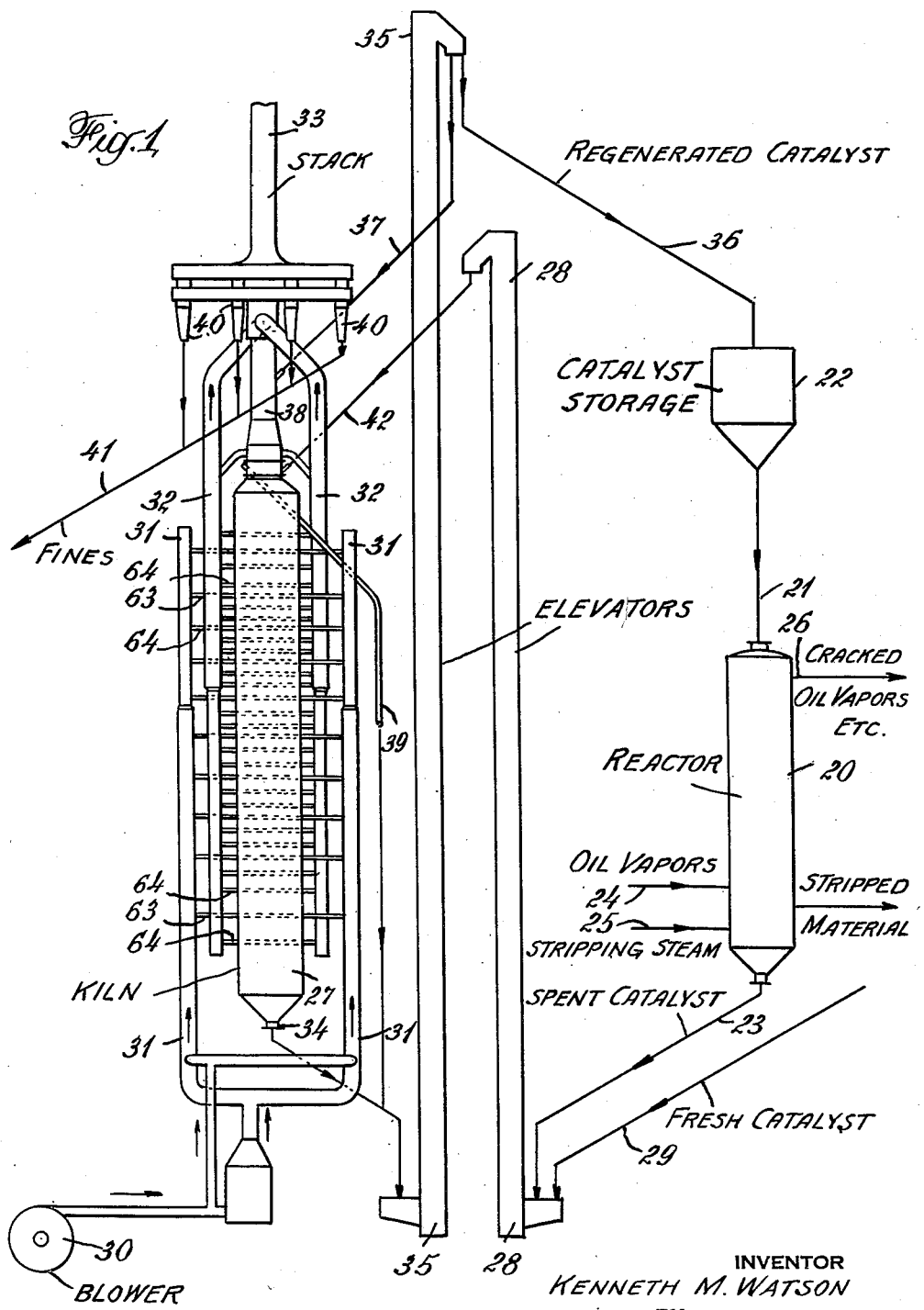
INVENTOR
KENNETH M. WATSON
BY
Pennie, Davis, Marvin & Edmonds
ATTORNEYS

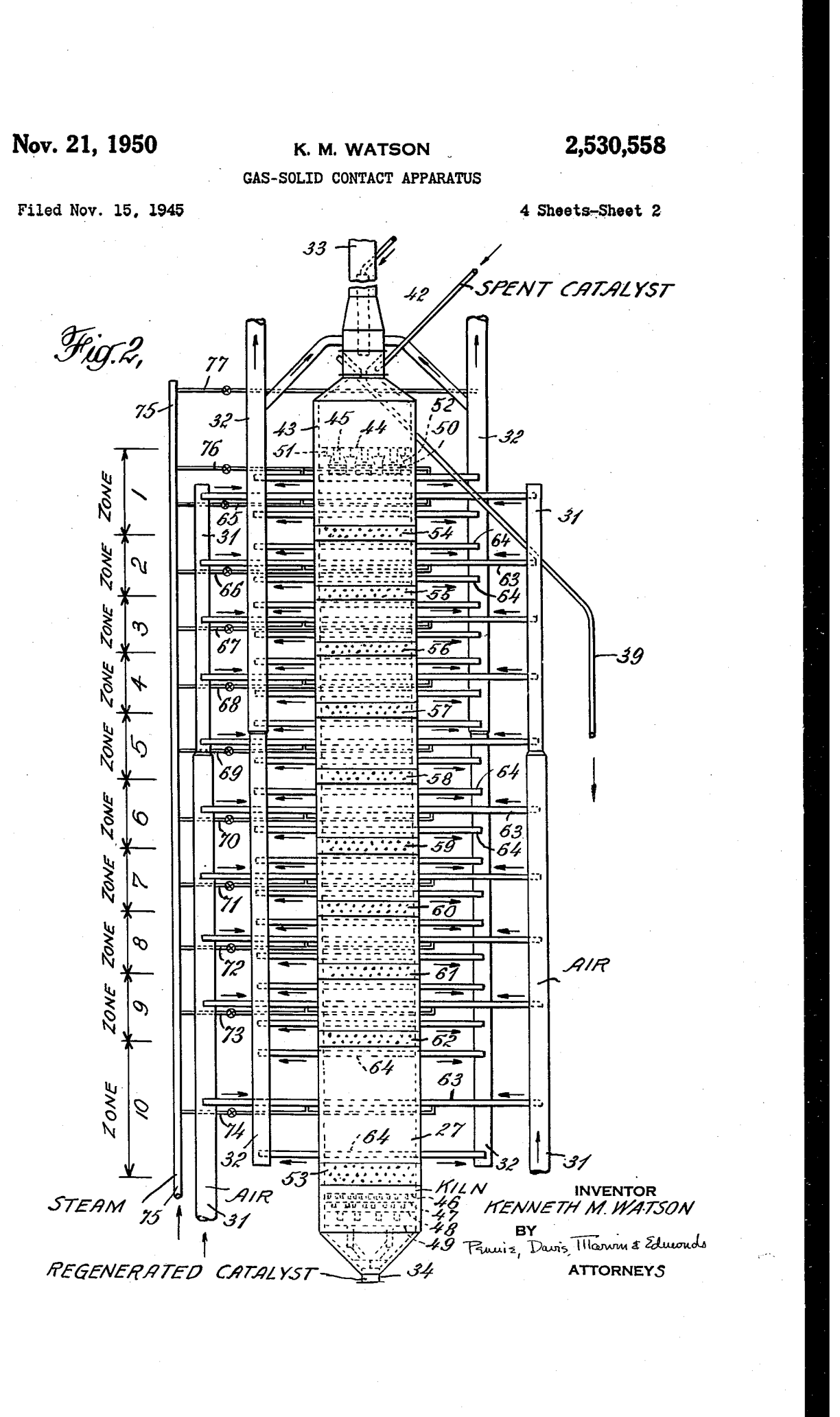

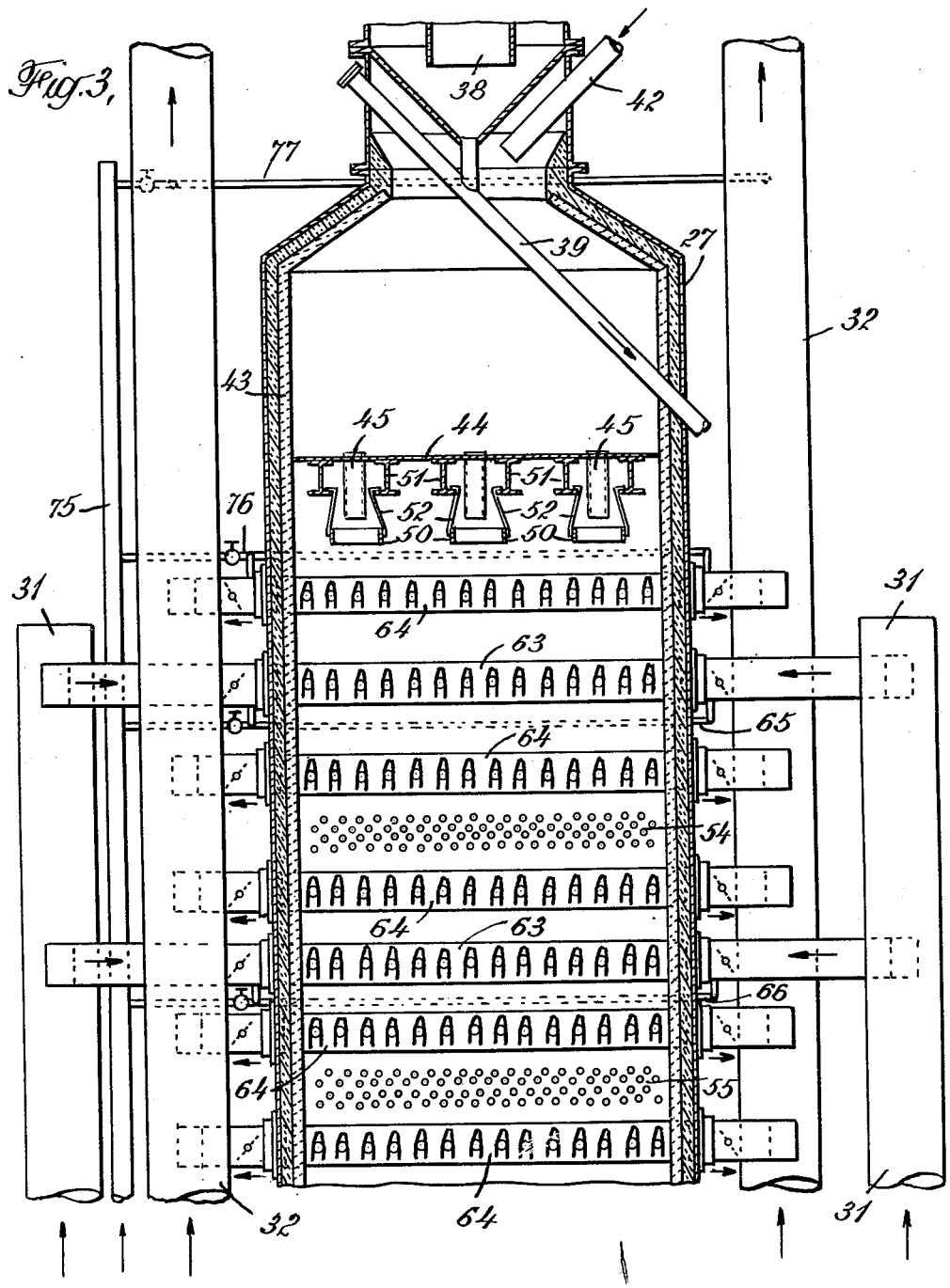

Nov. 21, 1950      K. M. WATSON      2,530,558
GAS-SOLID CONTACT APPARATUS
Filed Nov. 15, 1945      4 Sheets-Sheet 4
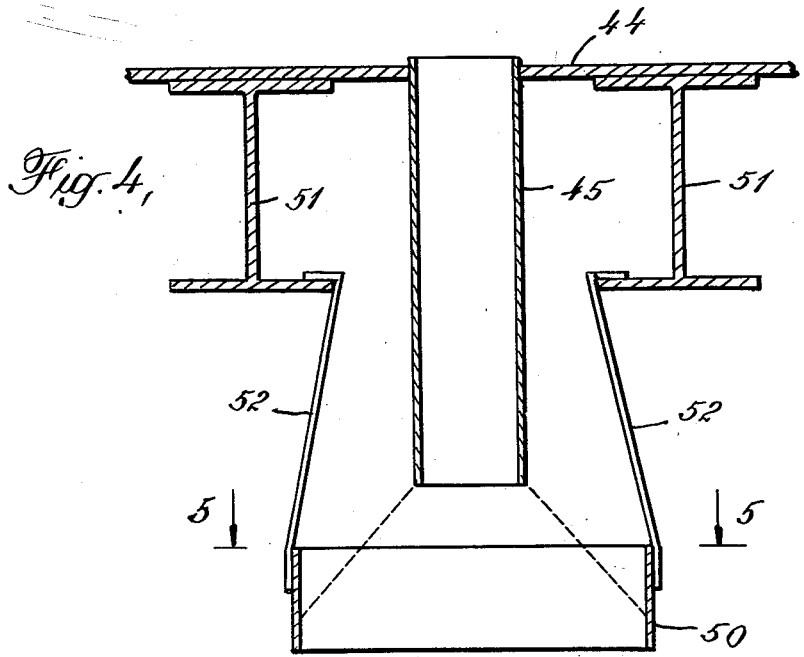
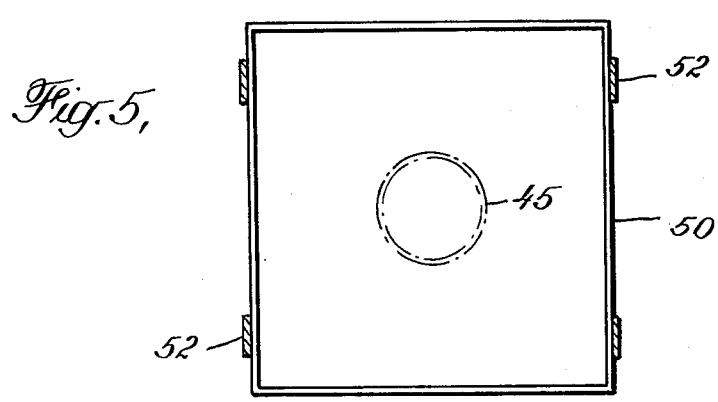
INVENTOR
KENNETH M. WATSON
BY
Prinie, Davis, Marvin & Edmonds
ATTORNEYS Patented Nov. 21, 1950

2,530,558

UNITED STATES PATENT OFFICE 2,530,558

GAS-SOLID CONTACT APPARATUS

Kenneth M. Watson, Madison, Wis., assignor to Sinclair Refining Company, New York, N. Y., a corporation of Maine Application November 15, 1945, Serial No. 628,798

2 Claims. (Cl. 23—288)

This invention relates to improvements in apparatus in which a downwardly moving bed of a granular solid is contacted with an aeriform fluid. The invention is particularly valuable as applied to regenerating kilns of square cross section in which partially or completely spent granular catalyst from an oil cracking operation is subjected to burning to remove carbonaceous deposits, and it will be specifically described in that connection. In the instance of such kilns, the aeriform fluid is a combustion-supporting gas, conventionally air, and is introduced into the kiln at a plurality of points intermediate the port for catalyst introduction at the top of the kiln and the port for catalyst discharge at the bottom of the kiln.

It is highly desirable in the operation of such kilns to the end of avoiding irregularities in burning with consequent reduction in the efficiency and capacity of the kiln that the catalyst be equally distributed across the kiln upon its introduction thereinto, that regularity of catalyst flow be maintained and that the rate of downward flow of the catalyst be substantially uniform across the kiln. In the conventional regenerating kiln, these desiderata are sought to be attained by providing, in conjunction with a plurality of vertically disposed cylindrical catalyst distributing tubes in the upper portion of the kiln below the point of catalyst introduction, a series of apertured collector plates or baffles in the lower part of the kiln above the point of catalyst discharge, the lowest of the baffles having the fewest apertures, and each above having more than the next below, the apertures in each baffle being arranged with respect to the apertures in the next lower baffle, or the catalyst discharge port in the lower end of the kiln (in the case of the lowest baffle), so that the several paths of flow through the apertures in the highest baffle are eventually gathered in a single path of flow through the catalyst discharge port.

While it would seem that the arrangement of distributing tubes and baffles would provide for the equal distribution of the catalyst and would induce regular and uniform catalyst flow, in actual operation experience has been otherwise. One manifestation of irregularity and non-uniformity of catalyst flow, undesirable of itself, is "bumping," which is particularly pronounced during periods of initial operation for example after shut-down for routine inspection and replacement of worn parts. This "bumping," which may become so severe as to do serious equipment damage, is due in a large measure to the fact that the flow of catalyst through the distributing tubes tends to proceed in a surging or pulsating fashion resulting in a series of avalanches or cascades down the surfaces of the piles of discharged catalyst below the tubes.

In accordance with the present invention, I achieve substantial improvements in regenerating kiln operation by associating with the distributing tubes, means which operate to smooth the flow of catalyst from the tubes and which, at the same time, provide for distribution of the catalyst across the kiln in a square pattern consistent with the cross sectional shape of the kiln. My invention will be readily understood from the accompanying drawings which, while diagrammatic and conventional, are in general of scale proportions.

In the drawings,

Fig. 1 is a flow diagram of a cracking system embodying a kiln of the type to which my invention most particularly relates;

Fig. 2 is an elevation of a kiln such as that illustrated in Fig. 1;

Fig. 3 is an enlarged section of the upper part of the kiln illustrated in Fig. 2;

Fig. 4 is a vertical section through one of the distributing tubes and associated elements;

Fig. 5 is a section taken on line 5—5 of Fig. 4.

Referring to Fig. 1 as a diagram of the cracking operation as a whole: a charge of catalyst is maintained in a reactor 20, the regenerated catalyst being supplied from storage chamber 22 through connection 21 and spent catalyst being discharged through connection 23. The temperature in the reactor may approximate, for example, 900°–975° F. and the pressure in the reactor may approximate 6–10 pounds per square inch gauge. Connection 21 is made long enough to serve as a seal. The hydrocarbons to be cracked are introduced into the reactor as a vapor mixture through connection 24. Steam to strip the spent catalyst leaving the reactor of vaporizable material is introduced through connection 25. The cracked hydrocarbons together with any uncracked material and the stripping steam leave the reactor as a vapor mixture through connection 26. Spent catalyst is lifted to the top of the kiln 27 by means of bucket elevator 28, entering the kiln through connection 42. Any fresh catalyst required to maintain the volume of catalyst in circulation in the system is introduced through connection 29 and lifted to the top of the kiln 27 by means of elevator 28 together with the spent catalyst. The catalyst moves downwardly through the kiln through a series of bodies in a corresponding series of zones through which air is blown by means of blower 30 and distributing ducts or manifolds 31 with appropriate connections to each of the several zones. The products of combustion escape from each of the several zones through ducts or manifolds 32, ultimately escaping through stack 33. The regenerated catalyst discharged from the lower end of the kiln through connection 34 is lifted to the catalyst storage chamber 22 by means of bucket elevator 35. Part of the regenerated catalyst passes from the head of elevator 35 directly to chamber 22 through connection 36. Another part, 5%–10% of the total for example, passes through connection 37 to an elutriator 38. In this elutriator this diverted part of the regenerated catalyst falls through a rising stream of part of the gases passing to the stack, the fines being carried off with the gases and the coarser material returned through connection 39 to the foot of the elevator 35. In this manner the proportion of fines in the circulating catalyst can be kept within a chosen maximum. As a control, the proportion of the stack gases diverted through the elutriator can be varied or the proportion of the regenerated catalyst diverted to the elutriator can be varied. Before escaping through the stack 33 the products of combustion pass through a series of cyclone separators 40 in which fines carried out of the elutriator together with any fines carried out of the kiln proper are separated and discharged through connection 41. The kiln, the catalyst storage chamber, the reactor, the elevators and the several connections through which the catalyst passes are thermally insulated to minimize heat loss. By passing fresh catalyst through the kiln as it enters the system, such fresh catalyst is brought to the same temperature as the bulk of the circulating catalyst before it enters the catalyst storage chamber or the reactor.

Referring now particularly to Figs. 2 and 3 showing the kiln of Fig. 1 in greater detail: the kiln comprises a square, thermally-insulated, and refractory-lined shell 43. To promote uniform distribution of catalyst over a horizontal section of the kiln, a distributor plate 44 carrying distributing tubes 45 is arranged at the upper end of the kiln, and, to promote uniform flow of the catalyst downwardly through the kiln, a series of apertured collector plates or baffles 46, 47, 48 and 49, each carrying appropriately arranged distributing tubes, is provided in the lower part of the kiln. Associated with the distributing tubes 45 are attachments 50, supported by the plate 44 through rails 51, fastened to the plate, and brackets 52. These attachments 50 (see Figs. 4 and 5) have the form of topless and bottomless boxes which viewed in plan define a square. The width of the boxes is preferably equal to from three to four times the depth which most suitably approximately equals the internal diameter of the tubes. Each box is so positioned with relation to the tube with which it is in functional association that a line defining the angle of repose of the catalyst intersects the lower edge of the box at the corners. The dotted line in Fig. 4 is also a line defining the angle of repose of the catalyst, but since said Fig. 4 is a vertical section through one of the boxes, said line is shown as intersecting a face of said box above the lower edge thereof. In one installation, to cite an illustration, I employed, with tubes having an overall length of twenty-two and three-quarters inches and an internal diameter of six inches, boxes twenty-two inches square having a depth of six inches, spaced four inches from the ends of the tubes.

In operation of the kiln, spent catalyst is charged into the upper end of the kiln through connection 42 and regenerated catalyst is discharged from the lower end of the kiln through connection 34, the kiln being maintained substantially full of catalyst between the lower ends of the distributing tubes 45 and the collector plate 46. This charge of catalyst is divided into 10 bodies by 9 groups of tubes 54, 55, 56, 57, 58, 59, 60, 61 and 62, through which a cooling medium is circulated, each of these bodies being within a zone independent of the others for control purposes. Another and a somewhat larger group of collecting tubes 53 is arranged beneath the tenth body. For convenience of reference, these several zones are numbered in Fig. 2, the zone through which the catalyst first passes numbered 1 and the zone through which the catalyst last passes being numbered 10. A grid of distributing troughs 63 for introduction of air is arranged centrally of each zone and is connected to the air manifolds 31. Two grids of collecting troughs 64 for removal of flue gases are arranged in each zone, one above and one below the grid of distributing troughs, both being appropriately connected to stack manifolds 32. In the last zone, the tenth, the grids of collecting troughs are spaced farther from the grid of distributing troughs than in the other zones, and the body of catalyst in this zone is larger than in the other zones, but in other respects the arrangement of the several zones is the same. In each zone, in operation, air enters the body of catalyst in that zone through the grid of distributing troughs 63, flows in part upwardly through the body of catalyst toward the grid of collecting troughs above the grid of distributing troughs and in part downwardly through the body of catalyst toward the grid of collecting troughs positioned below the grid of distributing troughs.

Valved connections 65, 66, 67, 68, 69, 70, 71, 72, 73 and 74 are provided for introducing steam from manifold 75 into the grid of distributing troughs in each of the ten zones. Valved connections 76 and 77 are provided for introduction of steam from manifold 75 into the uppermost grid of collecting troughs in zone 1, and into the stack manifolds 32. The steam introduced through the several connections may serve as a cooling agent, or, in an emergency, as a smothering agent.

With boxes 50 spaced below the lower ends of the tubes as indicated in Fig. 4, the sides of the boxes form dams adapted to arrest the flow of catalyst at all points except at the corners of the boxes. These dams during intervals of surge thus operate to accumulate a backlog of catalyst which is supplied to the piles below the tubes during intervals between surges. As a result, a steady flow of catalyst is maintained at all times and "bumping" is substantially completely eliminated. That better distribution of catalyst follows from delivering the catalyst in squared piles consistent with the cross-sectional shape of the kiln is believed obvious. A less obvious advantage resides in the fact that in the case of the squared piles, there is relatively less lateral movement of catalyst between piles at the top of the piles than in the case of cylindrical piles. Such lateral movement materially contributes to the relatively poor uniformity in the rate of catalyst flow across the conventional kiln. The improvements in operation attained in the use of my invention cannot be attained by the simple expedient of using distributing tubes of square cross section because flow of a granular solid through such a tube occurs in a surging fashion just as in the instance of cylindrical tubes.

It is to be understood that my invention is not limited to regenerating kins but may be applied to any vertical shaft reaction vessel of square cross section through which a granular solid is caused to move from top to bottom.

I claim:

1. The combination in a vertical shaft reaction vessel of square cross section provided with a port for introduction of a granular solid at its upper end and a port for discharge of the granular solid at its lower end, of a horizontal plate in the upper portion of the vessel for receiving the granular solid admitted through the first port, a plurality of tubes depending from the plate for distributing the granular solid across the vessel, means associated with the tubes for smoothing and squaring the flow of the granular solid from the tubes, such means comprising, centered below each tube, a box-like element of greater width than depth the sides of which define a square of greater area than the cross-sectional area of the tube, said box-like element being open at the top and bottom and being of such size and so positioned relative to the tube that the flow of the granular solid therethrough is substantially arrested at all points except at the corners, and a vertical series of horizontally disposed apertured baffles in the lower part of the vessel above the discharge port.

2. The combination in a vertical shaft regenerating kiln of square cross section provided with a port for introduction of granular catalyst at its upper end and a port for catalyst discharge at its lower end, of a horizontal plate in the upper portion of the kiln for receiving catalyst admitted through the first port, cylindrical catalyst distributing tubes depending from the plate, means associated with the tubes for smoothing and squaring the flow of catalyst from the tubes, such means comprising, centered below each tube, a box-like element of square cross section having a depth approximately equalling the internal diameter of the tube and a width equal to from about three to four times the depth, said box-like element being open at the top and bottom and being of such size and so positioned relative to the tube that the flow of catalyst therethrough is substantially arrested at all points except at the corners, and a vertical series of horizontally disposed apertured baffles in the lower portion of the kiln above the discharge port.

KENNETH M. WATSON.

REFERENCES CITED

The following references are of record in the file of this patent:

UNITED STATES PATENTS

| Number | Name | Date |
|---|---|---|
| 2,416,214 | Payne | Feb. 18, 1947 |